United States Patent [19]

Bonin et al.

[11] Patent Number: 4,921,896

[45] Date of Patent: May 1, 1990

[54] FIREPROOFED POLYAMIDE COMPOSITIONS

[75] Inventors: Yves Bonin, Brignais; Jack LeBlanc, St Genis-Laval, both of France

[73] Assignee: Rhone-Poulenc Chimie, Courbevoie, France

[21] Appl. No.: 256,921

[22] Filed: Oct. 12, 1988

[30] Foreign Application Priority Data

Oct. 12, 1987 [FR] France ............................. 87 14268

[51] Int. Cl.$^5$ ............................ C08K 3/30; C08K 3/22
[52] U.S. Cl. .................................... 524/403; 523/205; 524/80; 524/420; 524/432; 524/451; 524/493; 524/606
[58] Field of Search ............... 524/80, 403, 420, 432, 524/493, 451; 523/205

[56] References Cited

U.S. PATENT DOCUMENTS

| | | | |
|---|---|---|---|
| 3,936,413 | 2/1976 | Wurmb et al. | 524/420 |
| 4,092,460 | 5/1978 | Cerny et al. | 524/80 |
| 4,188,313 | 2/1980 | Cerny et al. | 524/80 |
| 4,193,907 | 3/1980 | Tacke et al. | 524/80 |
| 4,208,317 | 6/1980 | Cerny et al. | 524/80 |
| 4,255,319 | 3/1981 | Peters | 524/80 |
| 4,314,927 | 2/1982 | Theysohn et al. | 524/80 |
| 4,356,282 | 10/1982 | Largman | 524/80 |
| 4,493,913 | 1/1985 | Hirobe et al. | 524/80 |
| 4,559,372 | 12/1985 | Abel | 524/80 |
| 4,670,487 | 6/1987 | Nielinger et al. | 524/80 |

FOREIGN PATENT DOCUMENTS

| | | |
|---|---|---|
| 93456 | 11/1983 | European Pat. Off. . |
| 0141763 | 5/1985 | European Pat. Off. . |
| 2332306 | 6/1977 | France . |

*Primary Examiner*—Veronica P. Hoke
*Attorney, Agent, or Firm*—Burns, Doane, Swecker & Mathis

[57] ABSTRACT

Flameproofed polyamide-based molding compositions contain a fireproofing amount of a red phosphorus, at least one lanthanide compound, a stabilizing amount of talc and zinc sulfide and/or zinc oxide, and are well adopted for conversion into useful shaped articles presenting an attractive combination of properties in respect of flame resistance, resilience, arc tracking resistance and surface appearance.

16 Claims, No Drawings

FIREPROOFED POLYAMIDE COMPOSITIONS

BACKGROUND OF THE INVENTION

1. Field of the Invention

The present invention relates to novel compositions of matter based on a polyamide which has been fireproofed by means of a red phosphorus material, and which are particularly adopted for the production of shaped articles for the electrical and electronics industries. This invention especially relates to novel polyamide-based molding compositions adopted for the production of fireproofed shaped articles providing a good compromise of properties, in particular in respect of flame resistance, resilience, arc tracking resistance, and surface appearance.

2. Description of the Prior Art

It is known to this art that the addition of red phosphorus to polyamide-based compositions permits a high degree of fireproofing to be imparted thereto.

U.S. Pat. No. 3,883,475 describes fireproofed polyamide-based compositions in which attempts have been made to inhibit the release of very highly toxic phosphine, which forms as a result of a disproportionation reaction of red phosphorus under the influence of trace amounts of water which are present in the polymer and of the high temperature required for its conversion, by adding to the composition a metal compound, advantageously cupric oxide.

An improvement has been proposed in French Patent No. 2,367,100, namely, the use of cadmium oxide instead of CuO. In addition to its effectiveness (which is at least equal to that of CuO) in inhibiting the release of phosphine, cadmium oxide also enables production of shaped articles exhibiting a particularly high arc tracking resistance (within the meaning of NF Standard C 26,220), which is equal to or higher than 400 volts in the case of unfilled compositions and 375 volts in the case of compositions filled with more than 25% by weight of glass fibers.

In French Patent No. 2,553,783, a material to replace cadmium oxide (which exhibits some degree of toxicity) has been proposed, comprising of a lanthanide-based compound. With this adjuvant, the resulting fireproofed polyamide-based compositions can be shaped into articles offering a better compromise of properties, in particular in respect of fireproofing, resilience and arc tracking resistance, as opposed to the advantages associated with the use of cadmium oxide. Compare also U.S. Pat. No. 4,559,372.

However, serious problems remain concerning the appearance and the development, to a variable degree, of whitish stains (whitish bloom) on the surface of the articles fireproofed by means of red phosphorus, when these articles are subjected to the twin effect of a high temperature and of moisture. Problems of this type are encountered, for example, in hot, humid tropical countries.

. Cf. U.S. Pat. No. 4,092,284.

SUMMARY OF THE INVENTION

Accordingly, a major object of the present invention is the provision of improved fireproofed compositions which conspicuously avoid those disadvantages and drawbacks to date characterizing the state of this art, and notably those associated with the compositions described in the aforesaid French Patent No. 2,553,783. Briefly, it has now unexpectedly and surprisingly been found that the aforediscussed phenomenon of the appearance and development of stains can be counteracted, moreover without detriment to the values of such properties as fireproofing, resilience and arc tracking resistance, by incorporation of a judiciously selected stabilizer comprising mixtures of talc and zinc sulfide and/or zinc oxide.

More especially, the present invention features thermoplastic polyamide compositions which are fireproofed by means of red phosphorus and comprising at least one lanthanide-based compound, which are characterized in that they additionally comprise effective stabilizing amounts, on the one hand, of talc and, on the other hand, of zinc sulfide and/or zinc oxide.

DETAILED DESCRIPTION OF THE PREFERRED EMBODIMENTS OF THE INVENTION

More particularly according to the present invention, the polyamides to be fireproofed advantageously comprise those thermoplastic polyamides produced by polycondensation of saturated aliphatic dicarboxylic acids containing from 6 to 12 carbon atoms with saturated aliphatic diprimary diamines containing from 6 to 12 carbon atoms, polyaminoacids produced either by direct homopolycondensation of ω-aminoalkanoic acids containing a hydrocarbon chain of 4 to 12 carbon atoms, or by hydrolytic opening and polymerization of the lactams derived from these acids, copolyamides produced from the starting monomers for the abovementioned polyamides, with the proviso that the acid component of these copolyamides may additionally comprise, in part, terephthalic acid and/or isophthalic acid, and mixtures of such polyamides.

Exemplary of the polyamides produced by polycondensation of diacids and of diamines, representative are nylon 66 (polymer of hexamethylenediamine and adipic acid), nylon 69 (polymer of hexamethylenediamine and azelaic acid), nylon 610 (polymer of hexamethylenediamine and sebacic acid) and nylon 612 (polymer of hexamethylenediamine and dodecanedioic acid).

Exemplary polyaminoacids which are suitable are nylon 4 (polymer of 4-aminobutanoic acid or of γ-butyrolactam), nylon 5 (polymer of 5-aminopentanoic acid or of δ-valerolactam), nylon 6 (polymer of ε-caprolactam), nylon 7 (polymer of 7-aminoheptanoic acid), nylon 8 (polymer of caprylolactam), nylon 9 (polymer of 9-aminononanoic acid), nylon 10 (polymer of 10-aminodecanoic acid), nylon 11 (polymer of 11-aminoundecanoic acid) and nylon 12 (polymer of 12-aminododecanoic acid or of laurolactam).

And representative such copolyamides are, for example, nylon 66/610 (copolymer of hexamethylenediamine, adipic acid and sebacic acid) and nylon 66/6 (copolymer of hexamethylenediamine, adipic acid and caprolactam).

The polyamides which are especially adopted to be fireproofed according to the present invention are nylon 66, nylon 610, nylon 6, nylon 66/610 and nylon 66/6.

By the expression "red phosphorus" per the present invention are intended the various colored allotropic varieties of phosphorus (red, violet or black phosphorus) marketed under the designation of red phosphorus.

The amount of red phosphorus generally ranges from 1 to 30% by weight relative to the weight of the polyamide to be fireproofed. This amount preferably ranges from 2 to 15% by weight. Still more preferably, this amount ranges from 6 to 12%. As a general rule, it is desirable to employ the red phosphorus in a finely divided form, for example in the form of particles having a mean diameter not exceeding 200 μm, and preferably ranging from 1 to 100 μm.

As utilized herein, the term "lanthanide" connotes the metals of the Periodic Table which have atomic numbers ranging from 57 to 71, as well as to yttrium, which has similar properties, although having an atomic number of 39.

By the expression "lanthanide-based compound" are intended:

(i) an organic or inorganic derivative of any one of the lanthanides: cerium, lanthanum, praseodymium, neodymium, promethium, samarium, europium, gadolinium, terbium, dysprosium, holmium, erbium, ytterbium, thulium, lutetium and yttrium. The expression "at least one lanthanide-based compound" connotes that, apart from a single derivative, it is possible to use a mixture of organic derivatives or a mixture of inorganic derivatives, or a mixture of organic and inorganic derivatives of any one of the abovementioned lanthanides;

(ii) a mixture of organic and/or inorganic derivatives of a number of these lanthanides; the expression "at least one lanthanide-based compound" connotes that, apart from a single mixture, it is possible to use a combination of a number of mixtures of this type.

In general, because of the relative amounts of the compounds of the various lanthanides in the most common minerals, particularly in monazite and bastnaesite, when a derivative of a single lanthanide is employed, the latter is preferably cerium, lanthanum, praseodymium and neodymium. Among these metals, cerium and lanthanum are the most abundant and are therefore particularly suitable.

Mixtures of derivatives of a number of lanthanides may also be employed. It may be advantageous, in fact, to avoid carrying out the long and costly separation of all of the lanthanides present in relatively small amounts in the minerals which are commonly processed. In such case, the following mixtures are generally used:

(a) mixture of derivatives of cerium and of one or more of the other lanthanides;

(b) mixture of derivatives of lanthanum and of one or more other lanthanides selected from among praseodymium, neodymium, promethium, samarium, europium, gadolinium, terbium, dysprosium, holmium, erbium, ytterbium, thulium, lutetium and yttrium;

(c) mixture of derivatives of praseodymium and one or more other lanthanides selected from among neodymium, promethium, samarium, europium, gadolinium, terbium, dysprosium, holmium, erbium, ytterbium, thulium, lutetium and yttrium;

(d) mixture of derivatives of neodymium and of one or more other lanthanides selected from among promethium, samarium, europium, gadolinium, terbium, dysprosium, holmium, erbium, ytterbium, thulium, lutetium and yttrium.

When such mixtures of derivatives of a plurality of lanthanides are employed in the compositions according to the invention, cerium and/or lanthanum and/or praseodymium and/or neodymium generally constitute at least 40 mol % of the total amount of the lanthanides.

By "organic lanthanide derivative" are particularly intended the salts of various carboxylic acids, the metal derivatives of phenolic compounds, mercaptides and chelates of β-dicarbonyl compounds.

The organic lanthanide derivatives are more particularly selected from among:

(1) lanthanide salts:

(i) of monocarboxylic aliphatic acids containing from 2 to 30 carbon atoms, or dicarboxylic aliphatic acids containing from 3 to 30 carbon atoms, saturated or containing one or more ethylenic double bonds and capable of containing 1 or more substituents such as halogen atoms, hydroxyl groups, alkoxy groups containing from 1 to 12 carbon atoms, mercapto groups or phenyl, phenoxy, naphthyl or cyclohexyl groups whose rings are optionally substituted by one or more halogen atoms, hydroxyl groups, alkyl groups containing 1 to 6 carbon atoms or alkoxy groups containing 1 to 6 carbon atoms;

(ii) of benzoic, 1-naphthoic, 2-naphthoic, cyclopentanecarboxylic, cyclohexanecarboxylic, cyclopentenecarboxylic or cyclohexenecarboxylic acids, with the proviso that the ring moieties of these acids may contain one or more substituents such as halogen atoms, hydroxyl groups, alkyl groups containing 1 to 12 carbon atoms, alkenyl groups containing 2 to 12 carbon atoms, alkoxy groups containing 1 to 12 carbon atoms, phenyl, benzyl, phenoxy or cyclohexyl groups, alkoxycarbonyl groups containing 2 to 24 carbon atoms or alkenoxycarbonyl groups containing 4 to 24 carbon atoms;

(iii) of alkyl monoesters (the alkyl group containing 1 to 24 carbon atoms) or alkenyl monoesters (the alkenyl group containing 3 to 24 carbon atoms) of the previously indicated dicarboxylic aliphatic acids;

(iv) of heterocyclic carboxylic acids, especially those derived from pyridine, furan, thiophene, pyrrole and pyran, capable of containing one or more substituents such as halogen atoms, hydroxyl groups, alkyl groups containing 1 to 12 carbon atoms, alkoxy groups containing 1 to 12 carbon atoms, alkenyl groups containing 2 to 12 carbon atoms, alkoxycarbonyl groups containing 2 to 24 carbon atoms or alkenoxycarbonyl groups containing 4 to 24 carbon atoms;

(2) lanthanide phenolates derived from phenol, 1-naphthol or 2-naphthol, the ring moieties of which may contain one or more substituents such as halogen atoms, alkyl or alkoxy groups containing 1 to 24 carbon atoms, alkenyl groups containing 2 to 24 carbon atoms, or phenyl, benzyl, phenoxy or cyclohexyl groups;

(3) lanthanide mercaptides, especially those derived from thioglycolic or thiomalic acids and from their alkyl esters (the alkyl radical containing 1 to 12 carbon atoms), alkenyl esters (the alkenyl radical containing 2 to 12 carbon atoms), phenyl, benzyl, cyclohexyl, alkanediol (containing from 2 to 12 carbon atoms), dihydroxybenzene or dihydroxycyclohexane esters, with the proviso that the ring moieties of the said esters may be substituted by one or more alkyl or alkoxy radicals containing from 1 to 6 carbon atoms;

(4) lanthanide anthanide chelates of β-dicarbonyl compounds, especially those derived from the compounds of the general formula (I):

$$R_1-CO-CHR_2-CO-R_3 \qquad (I)$$

in which $R_1$ and $R_3$, which may be identical or different, are each a linear or branched chain alkyl group containing 1 to 36 carbon atoms, optionally substituted by one or more halogen atoms; a linear or branched chain alkenyl group containing 3 to 36 carbon atoms, optionally substituted by one or more halogen atoms; an aryl radical or an aryl radical bearing on the aromatic ring one or more substituents, such as, alkyl radicals containing 1 to 6 carbon atoms, optionally substituted by one or more halogen atoms, alkenyl radicals containing 2 to 6 carbon atoms, optionally substituted by one or more halogen atoms, alkenyl radicals containing 2 to 6 carbon atoms, optionally substituted by one or more halogen atoms, the nitro group, the —CHO group, the —COOH group, alkoxy groups containing 1 to 6 carbon atoms, —COOR$_4$ groups, R$_4$ being an alkyl radical containing 1 to 12 carbon atoms or an alkenyl radical containing 2 to 12 carbon atoms, the OH group, or halogen atoms; an aralkyl radical whose aliphatic moiety contains from 1 to 12 carbon atoms and whose ring moiety may contain one or more of the previously indicated substituents; a cycloaliphatic radical containing from 5 to 12 carbon atoms and whose ring moiety may contain one or more carbon-carbon double bonds and may be substituted by one or more of the previously indicated substituents; a concatenation of a number of the previously indicated radicals; and with the proviso that the different previously defined aliphatic radicals may contain one or more bridging oxygen atoms —O—or sulfur atoms —S—or carbonyl groups —CO—or carboxylate groups —COO—; and R$_2$ is a hydrogen atom.

Among the organic lanthanide derivatives which are suitable for incorporation in the compositions according to the invention, the following are advantageously selected, in particular for practical reasons or for the economic reasons of availability or of price:

(a) lanthanide salts:
(i) of monocarboxylic aliphatic acids containing from 6 to 24 carbon atoms, saturated or containing an ethylenic double bond, and which may contain one or more substituents such as chlorine atoms, hydroxyl groups, alkoxy groups containing from 1 to 6 carbon atoms, or phenyl, phenoxy or cyclohexyl groups, these cyclic groups being optionally substituted by one or more chlorine atoms, hydroxyl groups, alkyl or alkoxy groups containing 1 to 6 carbon atoms;
(ii) of mercaptomonocarboxylic acids containing from 2 to 6 carbon atoms or mercaptodicarboxylic acids containing from 3 to 6 carbon atoms;
(iii) of benzoic or cyclohexanecarboxylic acids, the ring moiety of which may contain one or more substituents such as chlorine atoms, hydroxyl groups, alkyl or alkoxy groups containing 1 to 6 carbon atoms, or alkoxycarbonyl groups containing 2 to 12 carbon atoms;
(iv) of alkyl monoesters (the alkyl group containing 1 to 12 carbon atoms) of dicarboxylic aliphatic acids containing 4 to 24 carbon atoms, saturated or containing an ethylenic double bond, and which may contain one or more substituents such as chlorine atoms, hydroxyl groups, mercapto groups or alkoxy groups containing 1 to 6 carbon atoms;

(b) lanthanide phenolates derived from phenol, the ring moiety or which may contain one or more substituents such as chlorine atoms, alkyl or alkoxy groups containing 1 to 12 carbon atoms, or phenyl, benzyl, phenoxy or cyclohexyl groups.

As specific examples of organic lanthanide derivatives suitable for use according to the invention, representative are:

(1) lanthanide salts, especially cerium, lanthanum, praseodymium and neodymium salts of propionic, hexanoic, n-octanoic, 2-ethylhexanoic, isooctanoic, nonanoic, decanoic, lauric, stearic, oleic, ricinoleic, margaric, tetradecanoic, 12-hydroxystearic, docosanoic, 13-docosenoic (erucic acid), 2-chlorodecanoic, 2-octyldecanoic, 2-hydroxyhexanoic, thioglycolic, mercaptopropionic, thiomalic, 6-cyclohexylhexanoic, benzoic, phenylacetic, 2-phenylpropanoic, 2-methylbenzoic, 4-methylbenzoic, 2phenoxybenzoic, 4-propylbenzoic, 4-methoxybenzoic, 4-tertbutylbenzoic, salicylic, 5-tertbutylsalicylic, 4-hydroxy-3-methoxybenzoic, 3,4-dimethoxybenzoic,-1-naphthoic, 2-naphthoic, cyclohexanecarboxylic, nicotinic, isonicotinic or 4-methylfuran-3-carboxylic acids, of monoisooctyl maleate, or mono(2-ethoxyethyl)maleate, of monobutyl phthalate, of monobutyl thiomalate, or of monohexyl thiomalate;

(2) lanthanide phenolates, especially cerium, lanthanum, praseodymium and neodymium phenolates of the following phenolic compounds: phenol, cresols, ethylphenols, xylenols, butylphenols, isopentylphenols, isooctylphenols, tert-nonylphenols, decylphenols, dodecylphenols, tertoctylphenols, 4-cyclohexylphenol, 4-phenylphenol, di-tertnonylphenols, or methyl isohexylphenols;

(3) lanthanide chelates, especially cerium, lanthanum, praseodymium and neodymium chelates of the following β-diketones: 2,4-heptanedione, 2,4-decanedione, 2-ethyl-2-decene-6,8-dione; 2-methyl-2-nonene-6,8-dione, stearoylacetone, 1-stearoyl-2-octanone, ethyl 7,9-dioxodecanoate, benzoylacetone, acetylacetone, 1-benzoyl-2-octanone, 1,4-diphenyl-1,3-butanedione, stearoylacetophenone, palmitoylacetophenone, 1-benzoyl-4-methylpentanone; benzoyloctacosanoylmethane; para-methoxybenzoylstearoylmethane; and dibenzoylmethane;

(4) lanthanide mercaptides, especially cerium, lanthanum, praseodymium and neodymium mercaptides of thioglycolic acid, of isooctyl thioglycolate, of octadecyl thioglycolate, of benzyl thioglycolate, of lauryl thioglycolate, or 1,4-cyclohexanediol dithioglycolate, of 4-tert-butylcyclohexyl thioglycolate, of thiomalic acid, of hexyl thiomalate, of 2-ethylhexyl thiomalate, of dodecyl thiomalate, of benzyl thiomalate, of cyclohexyl thiomalate, of 1,3-propanediol thiomalate, of 1,4-butanediol thiomalate and of 1,6-hexanediol thiomalate.

The organic lanthanide derivatives which are not available directly are prepared by traditional methods, such as the reaction of a carboxylic acid or of its anhydride, of a phenolic compound, of a mercaptocarboxylic acid (or one of its esters) or of a β-diketone with a lanthanide oxide or hydroxide, or, depending upon the particular circumstances, with a mixture of such oxides or hydroxides, in a suitable solvent medium and with heating if necessary.

By "inorganic lanthanide derivative" are particularly intended the oxides, hydroxides, salts of mineral hydracids and salts of mineral oxyacids.

More especially, the following are employed, for example, as lanthanide salts of mineral hydracids: the chloride, bromide, iodide, sulfide, selenide or telluride; as lanthanide salts of mineral oxyacids: the sulfite, sulfate, sulfonate, nitrite, nitrate, phosphite, phosphate, pyrophosphate, carbonate, perchlorate, antimoniate, arseniate, selenite, selenate, vanadate and tungstate.

Among the inorganic lanthanide derivatives suitable for use in the compositions according to the invention, those advantageously selected, particularly for practical reasons or for economic reasons of availability or of prices, are lanthanide oxides, chlorides, sulfates or nitrates.

The lanthanide in the lanthanide derivatives employed in the compositions according to the invention may be present in various oxidation states which it may possess; in most cases it is present in the oxidation states of III or IV.

In a very preferred embodiment of the present invention, an effective amount of at least one lanthanide-based compound is used, selected from among lanthanum (III) stearate, lanthanum (III) oxide, lanthanum (III) chloride, cerium (III) stearate, cerium (IV) oxide and cerium (III) chloride.

The amount of lanthanide-based compound(s) employed may vary over very wide limits. More precisely, this amount is determined such as to introduce from $0.1 \times 10^{-3}$ to $100 \times 10^{-3}$ gram-atoms of metal belonging to the lanthanide group per 100 g of polyamide. This amount is preferably determined such as to introduce from $0.2 \times 10^{-3}$ to $30 \times 10^{-3}$ gram-atoms of the lanthanide group metal per 100 g of polyamide. Still more preferably, this amount is determined such as to introduce from $0.3 \times 10^{-3}$ to $10 \times 10^{-3}$ gram-atoms of the lanthanide group metal per 100 g of polyamide.

The lanthanide-based compound may be present in a solid or pasty form. In the case of a solid compound, this is generally employed in the form of particles having a mean diameter not exceeding 200 μm and, preferably, ranging from 0.5 and 100 μm.

As indicated above, the compositions in accordance with the present invention must additionally contain effective stabilizing amounts of, on the one hand, talc and, on the other hand, zinc sulfide and/or zinc oxide. The talc, of chemical formula $Mg_3Si_4O_{10}(OH)_2$, may particularly be of the ferriferrous variety, or of the nickeliferrous variety. As for the zinc sulfide, of chemical formula ZnS, this may particularly be either of the variety crystallized in the cubic system (blended) or of the variety crystallized in the hexagonal system (wurtzite). With regard to zinc oxide, of chemical formula ZnO, particularly preferred is the pure oxide prepared synthetically from zinc or, for example, from the sulfide, silicate or carbonate thereof. These inorganic compounds are generally employed in the form of particles having a mean diameter which, in this case also, does not exceed 200 μm and preferably ranges from 0.1 and 100 μm.

When the compound employed (lanthanide-based compound, talc, ZnS, ZnO) is available in an anhydrous form or in a form crystallized with water molecules, it is preferable to use the anhydrous compound to avoid any release of water during the conversion.

The amount of talc which is used may vary over quite wide limits as a function of the degree of stabilization required. Such amount advantageously ranges from 0.5 to 5% by weight relative to the weight of the polyamide present in the composition. The amount of the zinc compound(s) employed may also vary quite widely. This amount advantageously ranges from 0.1 to 5% by weight relative to the weight of the polyamide present in the composition. Preferably, the amounts of talc and of the zinc compound(s) are determined such that the ratio:

$$\frac{\text{weight of talc employed}}{\text{weight of the zinc compound(s) employed}}$$

ranges from 1 to 5, and, even more preferably, from 2 to 4.

The compositions according to the present invention may be prepared merely by mixing the various constituents in any suitable manner which enables a homogeneous composition to be produced. Preferably, the mixing of the various constituents in the form of powder or of granules is carried out by first producing a premix, cooled, in a conventional blender, then by homogenizing the entire mass by a hot kneading operation at a temperature which is generally above 200° C. in a single- or multi-screw extruder, the extrusion being preferably carried out under an inert atmosphere such as, for example, nitrogen or argon. Upon completion of this treatment, laces are obtained, which are cooled with water and are then chopped into granules, it being possible for the latter to then be subjected to a drying operation, if appropriate. The compositions according to the invention may, furthermore, be prepared by using a masterbatch, presented in the form of granules, based, on the one hand, on the polyamide to be fireproofed, on red phosphorus, on the lanthanide-based compound and on the talc +zinc compound(s) pair, which will then be blended, before use, with the granules of the remainder of the polyamide to be fireproofed.

These compositions have been defined above in terms of their essential constituents. However, such compositions can of course be further modified without departing from the scope of the present invention, for example as indicated below. Thus, with regard to the red phosphorus, for example, red phosphorus may be employed as such, or red phosphorus particles coated with a polymer film may be used, and this is a preferred embodiment. Among these polymers, representative are, in particular, epoxy resins (cf. French Patent No. 2,314,221), polymers containing unsaturated maleic, fumaric or allyl bonds (cf. French Patent No. 2,314,219), saturated polyesters having a melting point of from 50° to 90° C. and having a molecular weight of less than 10,000 (cf. French Patent No. 2,373,575), thermoplastic phenolformaldehyde polycondensates of the novolak type (cf. French Patent No. 2,344,615), and thermoplastic phenolisobutyraldehyde polycondensates (cf. European Patent Application No. 82/106,329.4, published under U.S. Pat. No. 0,071,788); the use of thermoplastic phenolformaldehyde polycondensates constitutes a particularly preferred embodiment of the present invention. The amount of polymer employed to coat the phosphorus particles, where applicable, may vary over wide limits. This amount generally constitutes 5 to 50% of the total weight of the mixture of red phosphorus and coating polymer. It will be appreciated that larger amounts of coating polymer, up to 90% of the total weight of the mixture of red phosphorus and coating polymer, may be employed without disadvantage.

Furthermore, when intended, for example, for the production of shaped objects, the compositions according to the invention may contain the various usual additives. They may thus contain reinforcing or gelling fillers such as glass or asbestos fibers, ballotini, kaolin, silica, micas, bentonites, bentones, or mixtures of such species. Among the abovementioned fillers, those most widely employed are glass fibers; these fibers generally have a mean diameter of from 1 to 15 μm and a length of from 2 to 8 mm. To produce articles having optimum mechanical properties, it is advantageous to employ fibers sized, for example, using epoxy resins, polyester resins, polyurethane resins or vinyl resins, these resins being generally associated with coupling agents of the aminosilane type. The proportions of fillers may range from, for example, 10% to 60% by weight relative to the weight of the polyamide in the composition.

Other additives may also be used, such as lubricants, stabilizers, impact strength improvers, pigments or colorants, antistatic agents and nucleating agents; these latter additives, as well as their use, are widely described in the literature.

The compositions according to the invention may be converted into finished or semifinished shaped articles by the usual injection or extrusion methods. One of the advantages of the subject compositions is in the fact that this conversion, which is generally carried out at a temperature on the order of 200 to 320° C., is accompanied by only a very slight emission of phosphine into the atmosphere. This is generally below 0.3 ppm and even below 0.1 ppm; the limit of 0.3 ppm represents the maximum concentration not to be exceeded (cf. the text by Sax, *Dangerous Properties of Industrial Materials*, 3rd edition, pages 1019 and 1020). Where the phosphorus contents are adequate, the articles obtained are fire-resistant and, when exposed to a flame, do not result in the formation of droplets of molten, possibly ignited material. The combustibility, according to the Underwriters Laboratories vertical UL 94 test (for specimens having a thickness of 1.6 mm) falls in the classification region ranging from V0 to V1. The articles obtained have an excellent arc tracking resistance which may be higher than 450 volts in the case of compositions filled with more than 25% by weight of glass fibers. It is found, furthermore, that the fireproofed articles obtained also have an excellent resilience which, beginning with compositions filled with more than 25% by weight of glass fibers, may reach and exceed 25 kJ/m$^2$ in a smooth Charpy impact. The performance in respect of fireproofing and of resilience is generally on the same order as that obtained in the absence of the stabilizer pair talc +zinc compound(s). On the other hand, insofar as the arc tracking resistance and the aging behavior in a hot and humid atmosphere are concerned, it is found that the performance is superior. In particular, with regard to the whitish bloom which appears during the aging of the fireproofed articles in a hot and humid atmosphere, it is noted that, in the case of the compositions according to the present invention, this phenomenon is very clearly ameliorated, compared with the results in the absence of the talc+zinc compound(s) pair, or with other stabilizing systems of a different type.

The fireproofed compositions according to the present invention are well suited for the production of shaped articles which can be employed in the electrical industries (for example electrical and electronics, electrical appliance, radio and motor vehicle industries). The characteristics of these compositions also make it possible to produce shaped articles by spinning and film extrusion.

In order to further illustrate the present invention and the advantages thereof, the following specific examples are given, it being understood that same are intended only as illustrative and in nowise limitative.

In said examples to follow, the test A described below was used to demonstrate the behavior of a control composition comprising:
(i) nylon 66;
(ii) red phosphorus coated with a phenolformaldehyde polycondensate;
(iii) glass fibers;
(iv) cerium (III) stearate; and
(v) a lubricant and a colorant, in respect of fireproofing, resilience, arc tracking resistance and aging behavior in a hot and humid atmosphere.

TEST A (1) Description of the raw materials:
(i) nylon 66 (polymer of hexamethylenediamine and of adipic acid): this was a polymer having a viscosity number of 133 ml/g (determined according to ISO Standard R 307, 1977 edition, on the fraction which was soluble in 90% formic acid);
(ii) coated red phosphorus: this was a composition which will be referred to hereinafter as the phosphorus masterbatch, containing 60% by weight of red phosphorus having a mean particle size of 20 to 30 μm, coated with 40% by weight of a phenol-formaldehyde polycondensate having a melting point of 80° C. and a molecular weight of 800 (a resin marketed by Bakelite under the trademark 85 36 29). This coating was carried out as follows: the resin was melted in a reactor heated to 120° C. with steam and the red phosphorus was added slowly under inert atmosphere while the temperature of the mixture was raised to 148° C.. The mixture was then cast in the form of plaques, which were broken into fragments under an inert atmosphere;
(iii) glass fibers: these were staple fibers having a mean diameter of 10 μm and a length of between 3 and 6 mm, comprising a sizing for polyamide, and marketed by Owens Corning Fiberglas under the trademark R 17 BX 1;
(iv) and (v) cerium (III) stearate Ce[C$_{17}$H$_{35}$COO]$_3$: this was employed mixed with polyethylene sebacate and with black pigment (product marketed by Norton Chimie under the trademark Spirit Black B); this mixture, referred to hereinafter as the color masterbatch, contained: 14.38% by weight of cerium (III) stearate, 45.10% by weight of polyethylene sebacate and 40.52% by weight of black pigment.

(2) Composition used in the test:
A composition was prepared from:
(a) 100 parts by weight of nylon 66;
(b) 38.82 parts by weight of glass fibers;
(c) 11.80 parts by weight of phosphorus masterbatch (red phosphorus: 7.08 parts by weight); and
(d) 4.658 parts by weight of color masterbatch (cerium (III) stearate: 0.669 parts by weight and $0.677 \times 10^{-3}$ gram-atoms of cerium/100 g of nylon).

(3) General operating procedure and control tests carried out:
The composition was prepared as follows:
A dry premix of the various constituents was first prepared at 25° C. by introducing same into a Moritz blender.

This premix was then melt-blended in a Prodex degassing extruder comprising a screw of diameter D equal to 65 mm and with a length of 24 D. The screw employed was a cylindroconical screw whose profile was adapted for processing polyamides. Argon was introduced continuously into the feed hopper of the degassing extruder. The extruder was also fitted with a die with two 5-mm diameter orifices. The extrusion conditions were as follows:

(a) temperature: 310°–270° C.
(b) vacuum: 79.8×10² Pa
(c) screw speed: 50 revolutions/min.

The pressure of the material at the end of the screw and the throughput of material were noted. The product collected in the form of lace was cooled by passing same through a cold water bath and it was then granulated and dried.

The molding powder thus obtained was used to determine the water content and the viscosity number of the nylon 66.

To determine the viscosity number, the time required for dissolution in formic acid was usually 2 hours at 25° C., to obtain complete dissolution.

The viscosity number of the nylon 66 was determined again, but this time on a molded specimen. These specimens were prepared using a DK type 60 screw press. In this press, granules of the molding powder were melted at a temperature of 280° C. to 300° C. (depending on the specimen type), while the mold was maintained at a temperature of 80° C.; the injection pressure was 80 MPa to 100 MPa (depending on the specimen type); the length of the injection cycle was from 17 s to 25 s (depending on the specimen type).

The following other characteristics were determined on the molded specimens under conditions which are indicated below:

(a) resilience, consisting of the Charpy impact strength: this was measured at 23° C. on smooth bar-type specimens, 60×10×4 mm, aged in a manner known per se at an RH of 0 or an RH of 50, according to NF Standard T 51 035. The results are expressed in kJ/m²;
(b) combustibility, according to the Underwriters Laboratories vertical UL 94 test, as described in the Bureau des Normalisations des Matieres Plastiques [Office for the Standardization of Plastic Materials] document 9750-1, to measure the degree of fireproofing; specimen dimensions: 127×12.7×1.6 mm;
(c) arc tracking resistance value (abbreviated to TRV) according to NF Standard C 26 220. The measurements were carried out on specimens 50×50×3 mm in size; and
(d) aging behavior in a hot and humid atmosphere, referred to hereinafter as tropicalization.

The tropicalization test was carried out according to the conditions of the NF Standard T 51 181 (test cycle C 3 A). Specimen dimensions: 100×100×3 mm. Operating procedure: the specimens were arranged vertically in a 20-liter desiccator containing 1500 cm³ of an aqueous solution of sulfuric acid containing 15% by weight of pure acid such as to provide a relative humidity of 93%; two specimens used as a screen were placed on the periphery of the desiccator; between the specimens used as a screen, there were arranged, on the one hand, two specimens molded from a composition to be tested (this conforms to Examples 1 and 2, given below, in this case) and, on the other hand, two specimens molded from a reference composition (that conforming to the present test A in this case). The desiccator was then placed in a heated oven at 70° C. for 8 hours, and then the oven heating was stopped, the oven door was opened and the desiccator and its contents were allowed to cool under these conditions for 16 hours. The combination: 8 hours of heating at 70° C. + 16 hours of cooling to ambient temperature constituted 1 aging cycle. The results of the surface appearance of the specimens were noted after 9 cycles and 17 cycles. Scoring of the results: this scoring ranged from 0 to 10; the value 0 indicated that there was no bloom; the value 10 indicated that the specimen was completely covered with whitish stains. The scoring took into account the extent and the intensity of the whitish bloom.

Furthermore, air samples were taken using a Draeger CH 31 101 tube during extrusion, at the outlet of the vacuum pump, in order to investigate the potential presence of phosphine.

(4) Results of Test A:

The results obtained are reported in the Table given below.

EXAMPLE 1

(1) Description of this example:

This example permitted investigation of the behavior of a composition based on polyamide and on glass fibers, fireproofed using coated red phosphorus and containing cerium (III) stearate, as well as a lubricant and a colorant, into which a mixture of talc and of zinc sulfide had additionally been incorporated.

More precisely, the amounts of talc and of zinc sulfide were introduced into the composition conforming to that of test A, in a proportion of:

(a) in respect of talc: 1.66% by weight relative to the nylon 66; and
(b) in respect of ZnS: 0.51% by weight relative to the nylon 66.

The resulting composition had therefore been prepared from the following constituents:

(i) 100 parts by weight of nylon 66;
(ii) 39.54 parts by weight of glass fibers;
(iii) 11.80 parts by weight of phosphorus masterbatch (red phosphorus: 7.08 parts by weight);
(iv) 4.66 parts by weight of color masterbatch (cerium (III) stearate: 0.670 parts by weight and $0.677 \times 10^{-3}$ gram-atoms of cerium/100 g of nylon);
(v) 1.66 parts by weight of talc; and
(vi) 0.51 parts by weight of ZnS.

In this example, the nylon 66, the glass fibers, the phosphorus masterbatch and the color masterbatch were identical to the constituents employed in Test A. With regard to the newly introduced talc, this was the product marketed by the Societe des Talcs de Luzenac under the trademark 15 MOO. The particle size distribution of this talc was as follows: 100% of particles below 15 μm and 50% of particles below 5μm. With regard to the ZnS introduced together with the talc, this was the product marketed by Sachtleben under the trademark Sachtolith HD-S. Its particle size distribution was as follows: 100% of particles below 45 μm, the mean diameter being 0.3 μm.

(2) General operating procedure and control tests performed:

The preparation of the composition was carried out as indicated above in section 3 of the description of Test A. It should be noted that the extrusion operating conditions were as follows in this case:

(a) temperature: 310° C.–270° C.
(b) vacuum: 79.8×10² Pa
(c) screw speed: 68 revolutions/min.

With regard to the control tests performed, the various physicomechanical characteristics mentioned above in section 3 of the description of Test A were determined. It should be noted that the conditions indicated in section 3 of the description of Test A were again used to produce the molded specimens.

(3) Results of Example 1:

The results obtained are reported in the Table which follows:

EXAMPLE 2

(1) Description of this example:

This example permitted investigation of the behavior of a composition based on polyamide and on glass fibers, fireproofed using coated red phosphorus and containing cerium (III) stearate as well as a lubricant and a colorant, into which a mixture of talc and zinc oxide had additionally been incorporated.

The same composition as that described above in Example 1, section 1, was prepared, but this time using the same amount of ZnO instead of 0.51 part by weight of ZnS. This oxide was the product marketed by Prolabo under the trademark ZnO-Light; the mean diameter of the oxide particles was 0.1 μm.

(2) General operating procedure and control tests performed:

The procedure was exactly as indicated above in Example 1, section 2.

(3) Results of Example 2:

The results obtained are reported in the Table which follows:

TABLE

| | EXTRUSION | | | MOLDING POWDER | | |
|---|---|---|---|---|---|---|
| TEST EXAMPLE | Material pressure, screw end, MPa | Material throughput kg/h | PH release ppm | Calculated phosphorus content % | Water content % | Viscosity number ml/g |
| A | 20 | 48 | <0.2 | 7.08 | 0.17 | 147 |
| 1 | 20 | 40 | <0.1 | 7.08 | 0.16 | 145 |
| 2 | 20 | 40 | <0.2 | 7.08 | 0.16 | 144 |

| | SMOOTH CHARPY IMPACT | | UL 94 class, | TRV | | Viscosity number for molded specimens, ml/g | Tropicalization | |
|---|---|---|---|---|---|---|---|---|
| TEST EXAMPLE | RHO kj/m² | RH50 kj/m² | 1.6 mm thickness | Voltage V | Erosion mm | | 9 cycles | 17 cycles |
| A | 31 | 24 | V-0 | 375 | 0.2 | 130 | 6 | 9 |
| 1 | 32 | 31 | V-0 | 475 | 0.1 | 133 | 2 | 4 |
| 2 | 29 | 23 | V-0/V-1 | 475 | 0.5 | 132 | 3 | 5 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A fireproofed polyamide-containing composition of matter having reduced blooming effects, comprising (i) a moldable polyamide, (ii) a fireproofing amount of a red phosphorus, (iii) at least one lanthanide compound in and amount of from about $0.1 \times 10^{-3}$ gram-atoms per 100 g of polyamide, and (iv) a stabilizer comprising talc in an amount of from about 0.5 to about 5% by weight of the polyamide and either zinc sulfide or zinc oxide, or admixture thereof in a total amount of from about 0.1 to about 5% by weight relative to the weight of the polyamide, wherein the stabilizer reduces blooming effects when said composition is exposed to high temperature and moisture.

2. The composition of matter as defined by claim 1, wherein the ratio:

$$\frac{\text{weight of talc}}{\text{weight of zinc sulfide and/or zinc oxide}}$$

ranges from about 1 to 5.

3. The composition of matter as defined by claim 1, said polyamide comprising the polycondensate of a saturated aliphatic dicarboxylic acid containing from 6 to 12 carbon atoms with a saturated aliphatic diprimary diamine containing from 6 to 12 carbon atoms; the homopolycondensate of an ω-aminoalkanoic acid containing from 4 to 12 carbon atoms, or the polymerizate produced by hydrolytic ring opening and polymerization of the lactams of such acids; the copolyamide copolymerizate of the above monomers, with the proviso that the acid component of such copolyamide may additionally comprise terephthalic acid and/or isophthalic acid; and mixtures of such polyamides.

4. The composition of matter as defined by claim 1, said lanthanide compound comprising (a) an organic or inorganic derivative of cerium, lanthanum, praseodymium, neodymium, promethium, samarium, europium, gadolinium, terbium, dysprosium, holmium, erbium, ytterbium, thulium, lutetium or yttrium, or (b) a mixture of organic and/or inorganic derivatives of a plurality of such lanthanides.

5. The composition of matter as defined by claim 1, comprising from about 1 to 30% by weight of the red phosphorus relative to the weight of the polyamide.

6. The composition of matter as defined by claim 1, comprising particles of red phosphorus coated with a polymer film.

7. The composition of matter as defined by claim 6, said polymer coating comprising an epoxy resin, a polymer containing maleic, fumaric or allylic unsaturation, a saturated polyester, a thermoplastic phenol-formaldehyde polycondensate, or a phenol-isobutyraldehyde polycondensate.

8. The composition of matter as defined by claim 1, comprising from about 10 to 60% by weight of glass fibers relative to the weight of the polyamide.

9. The composition of matter as defined by claim 1, comprising finely divided red phosphorus particulates having a mean diameter of up to 200 μm.

10. The composition of matter as defined by claim 9, said red phosphorus particulates having a mean diameter ranging from 1 to 100 μm.

11. The composition of matter as defined by claim 9, comprising finely divided lanthanide compound particulates having a mean diameter of up to 200 μm.

12. The composition of matter as defined by claim 1, in anhydrous state.

13. The composition of matter as defined by claim 1, said lanthanide compound comprising lanthanum (III) stearate, lanthanum (III) oxide, lanthanum (III) chloride, cerium (III) stearate, cerium (III) oxide, or cerium (III) chloride.

14. The composition of matter as defined by claim 11, comprising finely divided talc, zinc sulfide and/or zinc oxide particulates having a mean diameter of up to 200 μm.

15. A shaped article comprising the composition of matter as defined by claim 1.

16. A composition of matter comprising (i) a moldable polyamide, (ii) a fireproofing amount of a red phosphorus, (iii) at least one lanthanide compound, and (iv) a stabilizing amount of talc and either zinc sulfide or zinc oxide, or admixture thereof;

wherein the amount of lanthanide compound is from about $0.1 \times 10^{-3}$ to about $100 \times 10^{-3}$ gram-atoms per 100 g of polyamide;

wherein the amount of talc is from about 0.5 to about 5% by weight relative to the weight of the polyamide; and wherein the total amount of the zinc sulfide and/or zinc oxide is from about 0.1 to about 5% by weight relative to the weight of the polyamide.

* * * * *